(12) United States Patent
Minota (10) Patent No.: US 11,635,571 B2
(45) Date of Patent: Apr. 25, 2023

(54) PLUGGABLE OPTICAL MODULE AND OPTICAL COMMUNICATION SYSTEM

(71) Applicant: NEC Corporation, Tokyo (JP)

(72) Inventor: Yuuji Minota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/537,661

(22) Filed: Nov. 30, 2021

(65) Prior Publication Data

US 2022/0082757 A1 Mar. 17, 2022

Related U.S. Application Data

(63) Continuation of application No. 16/748,200, filed on Jan. 21, 2020, now Pat. No. 11,204,464, which is a (Continued)

(30) Foreign Application Priority Data

Jun. 15, 2015 (JP) .............................. JP2015-120419

(51) Int. Cl.
*G02B 6/25* (2006.01)
*G02B 6/42* (2006.01)
(Continued)

(52) U.S. Cl.
CPC ........... *G02B 6/255* (2013.01); *G02B 6/3897* (2013.01); *G02B 6/42* (2013.01); *G02B 6/4246* (2013.01);
(Continued)

(58) Field of Classification Search
CPC ........... G02B 6/423; G02B 6/256; G02B 6/42
(Continued)

(56) References Cited

U.S. PATENT DOCUMENTS 4,792,203 A * 12/1988 Nelson ...................... G02B 6/24
385/134
5,076,656 A * 12/1991 Briggs ................. G02B 6/3878
385/71
(Continued)

FOREIGN PATENT DOCUMENTS

CN 1185882 A 6/1996
CN 103516434 A 1/2014
(Continued)

OTHER PUBLICATIONS

International Search Report dated Jul. 12, 2016, in corresponding PCT International Application.
(Continued)

*Primary Examiner* — Kaveh C Kianni
(74) *Attorney, Agent, or Firm* — Sughrue Mion, PLLC (57) ABSTRACT

An object is to be capable of housing an optical fiber that connects between components not to exceed a bending limit of the optical fiber in a housing of a pluggable optical module. A pluggable electric connector (11) is configured to be insertable into and removable from an optical communication apparatus (93). An optical output module (12) outputs an optical signal (LS1) and a local oscillation light (LO). An optical reception module (13) outputs a communication data signal (DAT) generated by demodulating using the local oscillation light (LO). A pluggable optical receptor (15) is configured in such a manner that optical fibers are insertable thereinto and removable therefrom. A first optical fiber (F11) is connected between the optical output module (12) and the pluggable optical receptor (15). A second optical fiber (F12) is connected between the optical output module (12) and the optical reception module (13). A third optical fiber (F13) is connected between the optical reception module (13) and the pluggable optical receptor (15).
(Continued)

Optical fiber housing means winds extra lengths of the first to third optical fibers (F11 to F13) around a guide.

21 Claims, 10 Drawing Sheets

Related U.S. Application Data continuation of application No. 15/736,410, filed as application No. PCT/JP2016/001938 on Apr. 7, 2016, now Pat. No. 10,578,802.

(51) Int. Cl.

| | | |
|---|---|---|
| *G02B 6/255* | (2006.01) | |
| *G02B 6/46* | (2006.01) | |
| *H04B 10/40* | (2013.01) | |
| *G02B 6/38* | (2006.01) | |
| *G02B 6/44* | (2006.01) | |
| *H04B 10/61* | (2013.01) | |
| *G02F 1/025* | (2006.01) | |
| *G02F 2/00* | (2006.01) | |

(52) U.S. Cl.
CPC ......... *G02B 6/4257* (2013.01); *G02B 6/4261* (2013.01); *G02B 6/4292* (2013.01); *G02B 6/4454* (2013.01); *G02B 6/46* (2013.01); *G02F 1/025* (2013.01); *H04B 10/40* (2013.01); *H04B 10/61* (2013.01); *H04B 10/65* (2020.05); *G02F 2/00* (2013.01)

(58) Field of Classification Search
USPC .......................................................... 385/95
See application file for complete search history.

(56) References Cited

U.S. PATENT DOCUMENTS

| | | | | |
|---|---|---|---|---|
| 5,412,497 | A * | 5/1995 | Kaetsu ................ | G02B 6/4471 398/164 |
| 5,521,701 | A * | 5/1996 | Felger ................ | G01M 11/33 356/73.1 |
| 5,542,015 | A * | 7/1996 | Hultermans ......... | G02B 6/3897 385/139 |
| 5,778,132 | A * | 7/1998 | Csipkes ............... | H01S 3/06704 359/341.1 |
| 5,842,881 | A * | 12/1998 | Ecker .................. | H01R 12/775 333/260 |
| 5,879,173 | A * | 3/1999 | Poplawski ......... | H01R 13/6582 439/138 |
| 6,381,394 | B1 * | 4/2002 | Cabrera ............. | H01S 3/06704 359/341.1 |
| 6,504,989 | B1 * | 1/2003 | Gooding ............. | G02B 6/4454 385/135 |
| RE38,310 | E * | 11/2003 | DeMeritt ............ | G02B 6/4453 385/14 |
| 6,846,115 | B1 * | 1/2005 | Shang ................. | G02B 6/4277 439/91 |
| 7,856,185 | B2 * | 12/2010 | Hudgins ............. | H04B 10/075 398/24 |
| 8,950,954 | B2 * | 2/2015 | Wang .................. | H04B 10/801 385/94 |
| 9,235,014 | B2 * | 1/2016 | Wang .................. | G02B 6/423 |
| 9,570,883 | B2 * | 2/2017 | Zarbock ............. | G02B 6/4269 |
| 10,211,917 | B1 * | 2/2019 | Wang .................. | H04B 10/032 |
| 10,502,909 | B2 * | 12/2019 | Minota ............... | G02B 6/4278 |
| 10,578,802 | B2 * | 3/2020 | Minota .............. | H04B 10/40 |
| 10,678,073 | B2 * | 6/2020 | Krasulick ........... | G02F 1/0121 |
| 2002/0003940 | A1 * | 1/2002 | Araki ................. | G02B 6/4471 385/137 |
| 2003/0020986 | A1 * | 1/2003 | Pang .................. | G02B 6/4277 398/139 |
| 2003/0072062 | A1 * | 4/2003 | Pedersen ........... | H04B 10/2916 398/97 |
| 2003/0072063 | A1 * | 4/2003 | Adams, Sr. ........ | H04B 10/2916 398/173 |
| 2005/0169585 | A1 * | 8/2005 | Aronson ............. | H04B 10/40 385/89 |
| 2005/0201715 | A1 * | 9/2005 | Ellwood, Jr. ....... | G02B 6/2746 385/147 |
| 2007/0160327 | A1 * | 7/2007 | Lewallen ............ | G02B 6/3885 385/53 |
| 2007/0173202 | A1 * | 7/2007 | Binder ............... | H04B 7/15528 455/276.1 |
| 2009/0060531 | A1 * | 3/2009 | Biegert .............. | H04J 14/0232 398/214 |
| 2010/0081303 | A1 * | 4/2010 | Roth .................. | G02B 6/3817 439/607.03 |
| 2011/0026893 | A1 * | 2/2011 | Omori ................ | G02B 6/4453 385/135 |
| 2011/0211798 | A1 * | 9/2011 | Chen .................. | G02B 6/4448 29/592.1 |
| 2011/0268452 | A1 * | 11/2011 | Beamon .............. | H04W 72/23 398/116 |
| 2011/0274437 | A1 * | 11/2011 | Jones ................. | G02B 6/3879 398/141 |
| 2012/0155803 | A1 * | 6/2012 | Benjamin ........... | G02B 6/4204 385/33 |
| 2012/0281952 | A1 * | 11/2012 | McColloch ......... | G02B 6/4284 385/92 |
| 2014/0056592 | A1 * | 2/2014 | McColloch .......... | H04B 10/40 29/428 |
| 2014/0340487 | A1 * | 11/2014 | Gilliland ............ | G01S 7/4813 348/48 |
| 2015/0104177 | A1 * | 4/2015 | Kato .................. | H04B 10/40 398/79 |
| 2015/0147036 | A1 * | 5/2015 | Isenhour ............ | G02B 6/3833 29/862 |
| 2016/0103286 | A1 * | 4/2016 | Matsui ............... | G02B 6/4246 398/139 |
| 2018/0149814 | A1 | 5/2018 | Minota ............... | G02B 6/4278 |
| 2018/0343062 | A1 | 11/2018 | Voois et al. | |

FOREIGN PATENT DOCUMENTS

| | | |
|---|---|---|
| JP | H10-232321 A | 9/1996 |
| JP | 2007-86732 | 4/2007 |
| JP | 2011-033644 A | 2/2011 |
| JP | 2011-95611 | 5/2011 |
| JP | 2013-257461 A | 12/2013 |
| JP | 2015-55834 | 3/2015 |
| JP | 2015-079092 | 4/2015 |

OTHER PUBLICATIONS

Japanese Office Action for JP Application No. 2019-185506 dated Apr. 6, 2021 with English Translation.
Chinese Office Action for CN Application No. 202010460249.6 dated Jun. 15, 2021 with English Translation.

* cited by examiner

PLUGGABLE OPTICAL MODULE AND OPTICAL COMMUNICATION SYSTEM

CROSS-REFERENCE TO RELATED APPLICATIONS

The present application is a continuation application of U.S. patent application Ser. No. 16/748,200 filed on Jan. 21, 2020, which is a continuation application of U.S. patent application Ser. No. 15/736,410, which issued as U.S. Pat. No. 10,578,802, which is a National Stage Entry of international application PCT/JP2016/001938, filed Apr. 7, 2016, which claims the benefit of priority from Japanese Patent Application 2015-120419 filed on Jun. 15, 2015, the disclosures of all of which are incorporated in their entirety by reference herein.

TECHNICAL FIELD

The present invention relates to a pluggable optical module and an optical communication system.

BACKGROUND ART

An optical communication system is equipped with an optical module used for transmission and reception of an optical signal. In such optical module, particularly in digital coherent communication applications, a plurality of components are mounted in a relatively narrow housing. These plural components are connected by optical fibers that are used for connecting the components and arranged in the housing (e.g. Patent Literature 1).

CITATION LIST

Patent Literature

[Patent Literature 1] Japanese Unexamined Patent Application Publication No. 2015-55834

SUMMARY OF INVENTION

Technical Problem

However, the inventor has found that the above-described pluggable optical module used for the digital coherent communication includes some problems described below. In general, in the pluggable optical module that includes an optical transmission/reception function used for the digital coherent communication, an interface transmitting an optical signal and an optical output function (e.g. an optical output module) need to be connected by an optical fiber, and an interface receiving an optical signal from the outside and an optical reception function (e.g. an optical reception module) need to be connected by the optical fiber. Further, for demodulating an optical signal received in the digital coherent communication, it is required that coherent detection is performed by causing a modulated optical signal to interfere with a local oscillation light. Therefore, it is necessary to lead the local oscillation light split from a light of a predetermined wavelength output fr om a light source included in the optical output function to the optical reception function. Thus, an optical fiber connecting between the optical output function and the optical reception function is required. Accordingly, it is necessary to mount a plurality of components and at least three optical fibers, which are required for the digital coherent communication, in the housing of the pluggable optical module used for the digital coherent communication.

However, because a miniaturization requirement for the pluggable optical module used for the digital coherent communication is severe, it is difficult to arrange and fix the optical fibers in narrow gaps between the components in the housing not to exceed a bending limit.

The present invention has been made in view of the aforementioned circumstances and aims to, in a pluggable optical module, house an optical fiber that connects between components not to exceed a bending limit of the optical fiber in a housing in which a plurality of optical components are mounted.

Solution to Problem

An aspect of the present invention is a pluggable optical module including: a pluggable electric connector configured to be insertable into and removable from an optical communication apparatus, the pluggable electric connector being capable of communicating a modulation signal, a communication data signal, and a control signal with the optical communication apparatus, an optical output module configured to output a first optical signal modulated in response to the modulation signal and a local oscillation light, an optical reception module configured to output the communication data signal generated by demodulating a received second optical signal using the local oscillation light, a pluggable optical receptor configured in such a manner that optical fibers are insertable into and removable from the pluggable optical receptor, the pluggable optical receptor being capable of outputting the first optical signal to the optical fiber and forwarding the second optical signal received from the optical fiber to the optical reception module, a first optical fiber connected between the optical output module and the pluggable optical receptor, the first optical signal propagating through the first optical fiber, a second optical fiber connected between the optical output module and the optical reception module, the local oscillation light propagating through the second optical fiber, a third optical fiber connected between the optical reception module and the pluggable optical receptor, the second optical signal propagating through the third optical fiber, and optical fiber housing means including a guide around which the first to third optical fibers can circle, extra lengths of the first to third optical fibers being wound and housed by the guide.

An aspect of the present invention is a pluggable optical communication system including: an optical fiber configured to transmit an optical signal; a pluggable optical module configured in such a manner that the optical fiber is insertable into and removable from the pluggable optical module, the pluggable optical module outputting the optical signal to the optical fiber; and an optical communication apparatus configured in such a manner that the pluggable optical module is insertable into and removable from the optical communication apparatus, in which the pluggable optical module includes: a pluggable electric connector configured to be insertable into and removable from the optical communication apparatus, the pluggable electric connector being capable of communicating a modulation signal, a communication data signal, and a control signal with the optical communication apparatus, an optical output module configured to output a first optical signal modulated in response to the modulation signal and a local oscillation light, an optical reception module configured to output the communication data signal generated by demodulating a received second optical signal using the local oscillation light, a pluggable optical receptor configured in such a manner that optical fibers are insertable into and removable from the pluggable optical receptor, the pluggable optical receptor being capable of outputting the first optical signal to the optical fiber and forwarding the second optical signal received from the optical fiber to the optical reception module, a first optical fiber connected between the optical output module and the pluggable optical receptor, the first optical signal propagating through the first optical fiber, a second optical fiber connected between the optical output module and the optical reception module, the local oscillation light propagating through the second optical fiber, a third optical fiber connected between the optical reception module and the pluggable optical receptor, the second optical signal propagating through the third optical fiber, and optical fiber housing means including a guide around which the first to third optical fibers can circle, extra lengths of the first to third optical fibers being wound and housed by the guide.

ADVANTAGEOUS EFFECTS OF INVENTION

According to the present invention, in a pluggable optical module, it is possible to house an optical fiber that connects between components not to exceed a bending limit of the optical fiber in a housing in which a plurality of optical components are mounted.

DESCRIPTION OF EMBODIMENTS

Exemplary embodiments of the present invention will be described below with reference to the drawings. The same components are denoted by the same reference numerals throughout the drawings, and a repeated explanation is omitted as needed.

First Exemplary Embodiment

Figure 1:
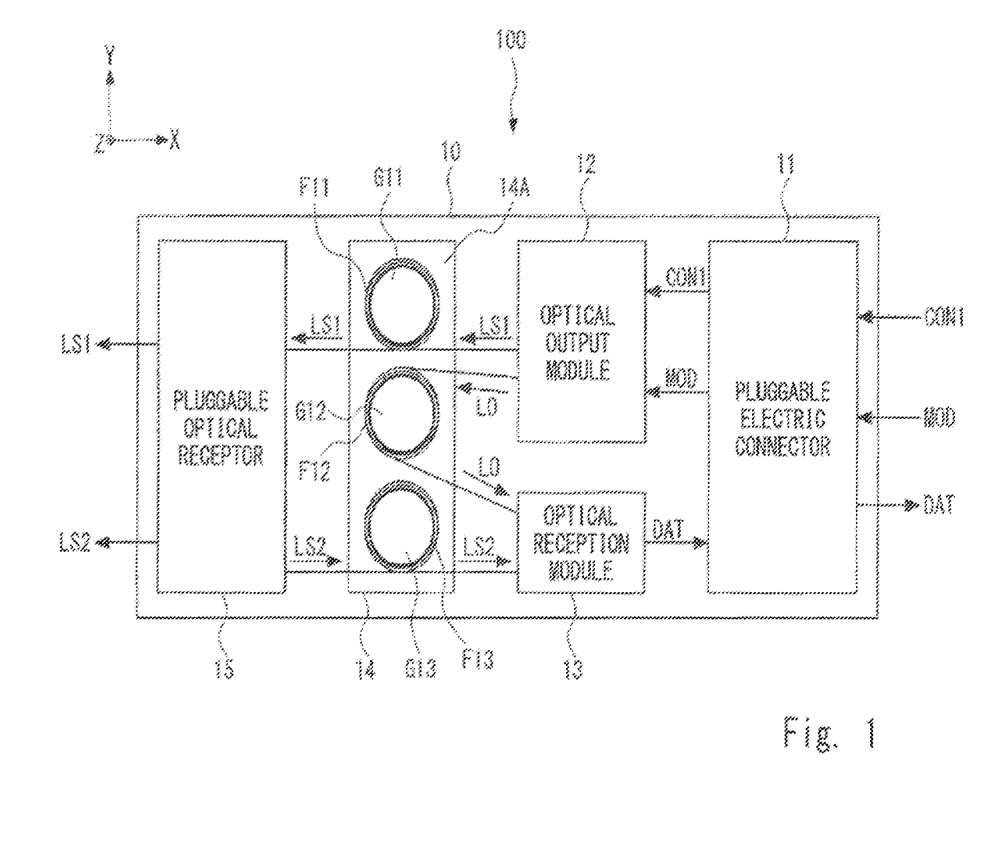
FIG. 1 is a block diagram schematically illustrating a configuration of a pluggable optical module according to a first exemplary embodiment.
Figure 2:
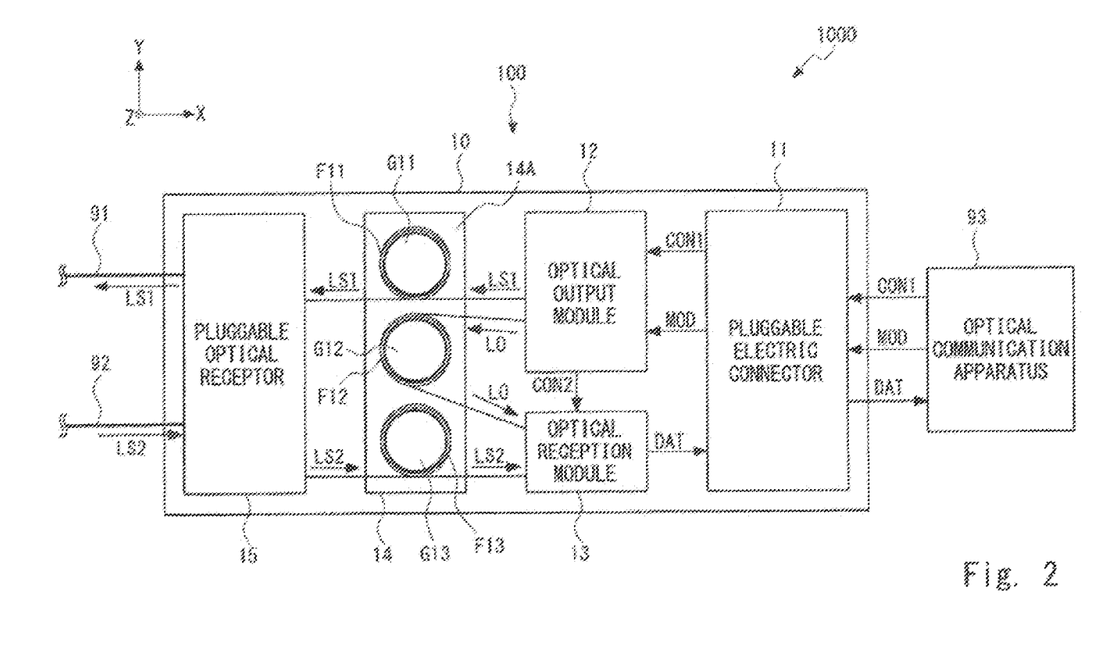
FIG. 2 is a block diagram illustrating an example of a main part of an optical communication system in which the pluggable optical module according to the first exemplary embodiment is mounted.

A pluggable optical module 100 according to a first exemplary embodiment will be described. FIG. 1 is a block diagram schematically illustrating a configuration of the pluggable optical module 100 according to the first exemplary embodiment. FIG. 2 is a block diagram illustrating a configuration example of a main part of an optical communication system 1000 in which the pluggable optical module 100 according to the first exemplary embodiment is mounted. As illustrated in FIG. 2, the pluggable optical module 100 is configured in such a manner that connectors of optical fibers with connector 91 and 92 are insertable into and removable from the pluggable optical module 100. For example, an LC connector and MU connector can be used as the connectors of the optical fibers with connector 91 and 92. The pluggable optical module 100 is controlled based on a control signal CON1 input from the optical communication apparatus 93 that is a communication host. The pluggable optical module 100 can also receive a modulation signal MOD that is a data signal from the optical communication apparatus 93 with the control signal CON1. In this case, the pluggable optical module 100 may output an optical signal LS1 (also referred to as a first optical signal) modulated based on the received modulation signal MOD through the optical fiber 91. The pluggable optical module 100 may also output a data signal DAT corresponding to an optical signal LS2 (also referred to as a second optical signal) received from the outside through the optical fiber 92 to the optical communication apparatus 93. For example, the optical communication apparatus 93 performs communication signal processing such as flaming processing of a communication data signal from the pluggable optical module 100 or a communication data signal input to the pluggable optical module 100.

The pluggable optical module 100 includes a pluggable electric connector 11, an optical output module 12, an optical reception module 13, optical fiber housing means 14, a pluggable optical receptor 15, a first optical fiber F11, a second optical fiber F12, and a third optical fiber F13.

The pluggable electric connector 11 is configured to be insertable into and removable from the optical communication apparatus 93. The pluggable electric connector 11 receives the control signal CON1 that is an electric signal output from the optical communication apparatus 93 and forwards the control signal CON1 to one or both of the optical output module 12 and the optical reception module 13. The pluggable electric connector 11 receives the modulation signal MOD that is an electric signal output from the optical communication apparatus 93 and forwards the modulation signal MOD the optical output module 12. The pluggable electric connector 11 forwards the data signal DAT output from the optical reception module 13 to the optical communication apparatus 93.

The optical output module 12 is controlled based on the control signal CON1 input from the optical communication apparatus 93 through the pluggable electric connector 11, and outputs an optical signal LS1 modulated based on the modulation signal MOD input from the optical communication apparatus 93 through the pluggable electric connector 11. The optical output module 12 includes a light source and a Mach-Zehnder type optical modulator. The Mach-Zehnder type optical modulator modulates a light from the light source with a predetermined modulation method to output the optical signal LS1. The optical output module 12 modulates the optical signal LS1 by applying the modulation signal MOD to phase modulation areas formed on optical waveguides of the Mach-Zehnder type optical modulator. The optical output module 12 can modulate the optical signal LS1 with various modulation methods such as phase modulation, amplitude modulation and polarization modulation, or a combination of the various modulation methods. Here, for example, the Mach-Zehnder type optical modulator is a semiconductor optical modulator or another optical modulator.

Here, the phase modulation area is an area that includes an electrode formed on the optical waveguide. An effective refractive index of the optical waveguide below the electrode is changed by applying an electric signal, e.g. a voltage signal, to the electrode. As a result, a substantial optical length of the optical waveguide in the phase modulation area can be changed. Thus, the phase modulation area can change a phase of the optical signal propagating through the optical waveguide. Then, the optical signal can be modulated by providing a phase difference between the optical signals propagating through two optical waveguides.

Figure 3:
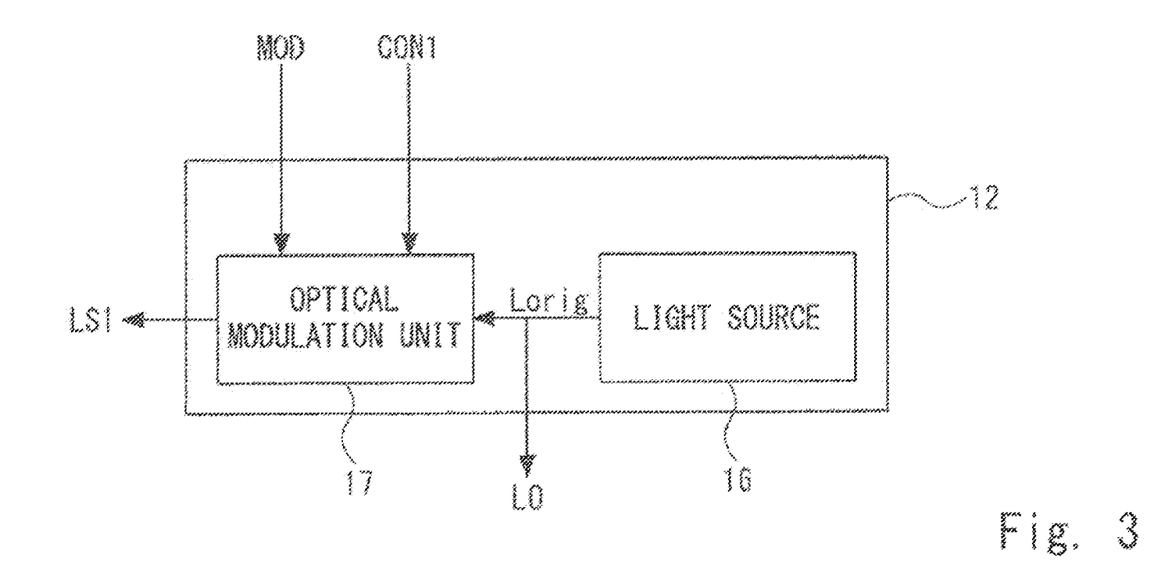
FIG. 3 is a block diagram illustrating a configuration example of an optical output module according to the first exemplary embodiment.

A configuration example of the optical output module 12 will be described. FIG. 3 is a block diagram illustrating the configuration example of the optical output module 12 according to the first exemplary embodiment. The optical output module 12 includes a light source 16 and an optical modulation unit 17. The light source 16 is, for example, a wavelength-tunable optical module that includes a semiconductor laser device and a ring oscillator and outputs an output light Lorig.

The optical modulation unit 17 is the Mach-Zehnder type optical modulator, for example. Note that the optical modulation unit 17 outputs the optical signal LS1 generated by modulating the output light Lorig in response to the modulation signal MOD corresponding to the communication data signal input from the optical communication apparatus 93 through the pluggable electric connector 11. A part of the light output from the light source 16 (the output light Lorig) is split, for example, by an optical splitter. The split light is output to the optical reception module 13 through the second optical fiber F12 as a local oscillation light LO.

Figure 4:
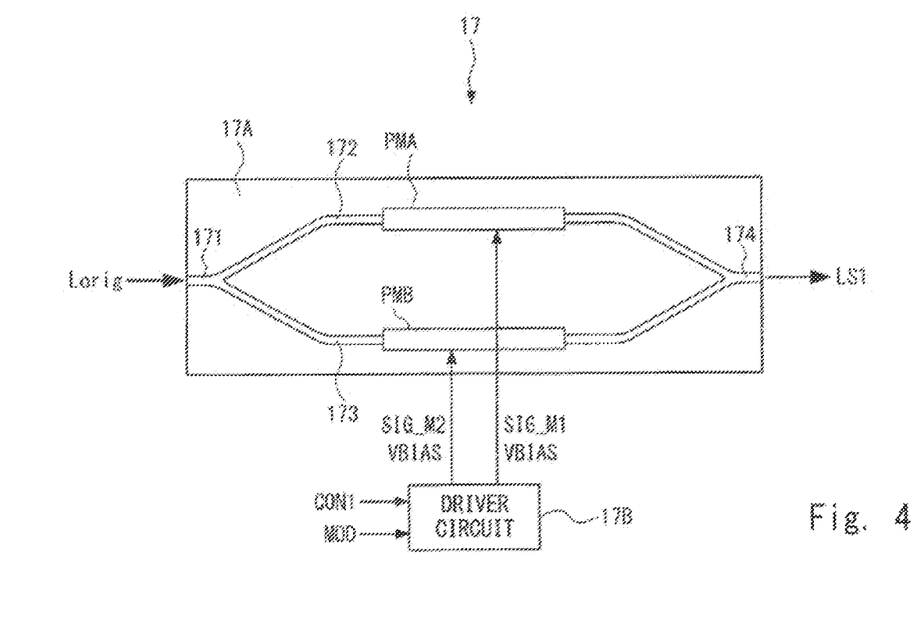
FIG. 4 is a diagram schematically illustrating a configuration of an optical modulation unit according to the first exemplary embodiment.

Subsequently, a configuration of the optical modulation unit 17 will be described. FIG. 4 is a diagram schematically illustrating the configuration of the optical modulation unit 17 according to the first exemplary embodiment. The optical modulation unit 17 is configured as a general Mach-Zehnder type optical modulator. The optical modulation unit 17 includes an optical modulator 17A and a driver circuit 17B.

The optical modulator 17A modulates the output light Lorig from the light source 16 to output the optical signal LS1. The optical modulator 17A includes optical waveguides 171 to 174, and phase modulation areas PMA and PMB. The output light Lorig from the light source 16 is input to one end of the optical waveguide 171. The other end of the optical waveguide 171 is optically connected with one end of the optical waveguide 172 and one end of the optical waveguide 173. Thus, a light propagating through the optical waveguide 171 is branched toward the optical waveguide 172 and the optical waveguide 173. The other end of the optical waveguide 172 and the other end of the optical waveguide 173 are connected with one end of the optical waveguide 174. On the optical waveguide 172, the phase modulation area PMA that changes a phase of a light propagating through the optical waveguide 172 is disposed. On the optical waveguide 173, the phase modulation area PMB that changes a phase of a light propagating through the optical waveguide 172 is disposed. The light signal LS1 is output from the other end of the optical waveguide 174.

The driver circuit 17B can control a modulation operation of the optical modulator 17A. The driver circuit 17B can also control a bias point of the optical modulator 17A by applying a bias voltage VBIAS to one or both of the phase modulation areas PMA and PMB in response to the control signal CON1. Hereinafter, it is assumed that the driver circuit 17B applies the bias voltage to the phase modulation areas PMA and PMB. The driver circuit 17B can also modulate the optical signal LS1 by applying the modulation signal MOD to one or both of the phase modulation areas PMA and PMB. In this example, the driver circuit 17B applies a modulation signal SIG_M1 to the phase modulation area PMA in response to the modulation signal MOD. The driver circuit 17B applies a modulation signal SIG_M2 to the phase modulation area PMB in response to the modulation signal MOD.

Although not illustrated, the optical output module 12 may include an optical adjustment unit. The optical adjustment unit may adjust power of the optical signal LS1 by attenuating or blocking the optical signal LS1 output from the optical output module 12. The optical adjustment unit may adjust the power of the optical signal LS1 in response to the control signal CON1 or a control signal other than the control signal CON1 input from the optical communication apparatus 93 through the pluggable electric connector 11. For example, an optical attenuator may be used as the optical adjustment unit.

The optical reception module 13 demodulates the optical signal LS2 received from the outside through the optical fiber 92 by causing the optical signal LS2 to interfere with the local oscillation light LO from the light source 16 of the optical output module 12. The optical reception module 13 outputs the data signal DAT that is a demodulated electric signal to the optical communication apparatus 93 through the pluggable electric connector 11.

Figure 5:
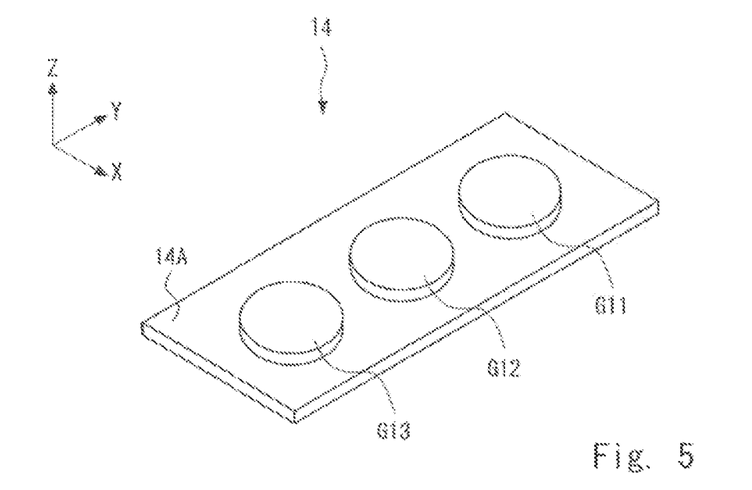
FIG. 5 is a perspective view schematically illustrating a configuration of optical fiber housing means according to the first exemplary embodiment.

The optical fiber housing means 14 has a configuration for winding and housing the extra lengths of the first to third optical fibers F11 to F13 disposed in the pluggable optical module 100. The optical fiber housing means 14 can be configured, for example, using resin. The optical fiber housing means 14 can be easily manufactured, for example, by injection forming using a mold. In this example, the optical fiber housing means 14 includes circular guides G11 to G13 (also referred to as first to third guides) configured to respectively wind the first to third optical fibers F11 to F13. FIG. 5 is a perspective view schematically illustrating a configuration of the optical fiber housing means 14 according to the first exemplary embodiment. In this example, as illustrated in FIG. 5, the circular guides G11 to G13 will be described as a thin cylindrical (or disk-like) member whose axial directions is a direction perpendicular to the planes of FIGS. 1 and 2 (i.e. Z direction) and as formed on a plate 14A, for example, made of resin.

One end of the first optical fiber F11 is connected with the optical output module 12 and the other end of the first optical fiber F11 is connected with the pluggable optical receptor 15. The optical signal LS1 output from the optical output module 12 propagates through the first optical fiber F11 and enters into the pluggable optical receptor 15. The extra length between both ends of the first optical fiber F11 is housed in such a manner that the first optical fiber F11 is wound around an outer perimeter of the circular guide G11 one or more times. Thus, the first optical fiber F11 longer than a distance between the optical output module 12 and the pluggable optical receptor 15 can be effectively housed and it is possible to prevent the first optical fiber F11 from tangling and interfering with the other optical components in the pluggable optical module 100. Note that the circular guide G11 is configured in such a manner that a bending curvature CV1 of the first optical fiber F11 due to winding does not exceed a maximum allowable bending curvature MCV1 of the first optical fiber F11 (i.e. CV1<MCV1). For example, a curvature GCV1 of an outer perimeter surface of the circular guide G11 is designed not to exceed the maximum allowable bending curvature MCV1 of the first optical fiber F11 (i.e. GCV1<MCV1).

One end of the second optical fiber F12 is connected with the optical output module 12 and the other end of second optical fiber F12 is connected with the optical reception module 13. The local oscillation light LO output from the optical output module 12 propagates through the second optical fiber F12 and enters into the optical reception module 13. The extra length between both ends of the second optical fiber F12 is housed in such a manner that the second optical fiber F12 is wound around an outer perimeter of the circular guide G12, for example, one or more times. Thus, the second optical fiber F12 longer than a distance between the optical output module 12 and the optical reception module 13 can be effectively housed and it is possible to prevent the second optical fiber F12 from tangling and interfering with the other optical components in the pluggable optical module 100. Note that the circular guide G12 is configured in such a manner that a bending curvature CV2 of the second optical fiber F12 due to winding does not exceed a maximum allowable bending curvature MCV2 of the second optical fiber F12 (i.e. CV2<MCV2). For example, a curvature GCV2 of the outer perimeter surface of the circular guide G12 is designed not to exceed the maximum allowable bending curvature MCV2 of the second optical fiber F12 (i.e. GCV2<MCV2).

One end of the first optical fiber F13 is connected with the optical reception module 13 and the other end of the first optical fiber F13 is connected with the pluggable optical receptor 15. The optical signal LS2 from the pluggable optical receptor 15 propagates through the third optical fiber F13 and enters into the optical reception module 13. The extra length between both ends of the third optical fiber F13 is housed in such a manner that the third optical fiber F13 is wound around an outer perimeter of the circular guide G13 one or more times. Thus, the third optical fiber F13 longer than a distance between the optical reception module 13 and the pluggable optical receptor 15 can be effectively housed and it is possible to prevent the third optical fiber F13 from tangling and interfering with other optical components in the pluggable optical module 100. Note that the circular guide G13 is configured in such a manner that a bending curvature CV3 of the third optical fiber F13 due to winding does not exceed a maximum allowable bending curvature MCV3 of the third optical fiber F13 (i.e. CV3<MCV3). For example, a curvature GCV3 of an outer perimeter surface of the circular guide G13 is designed not to exceed the maximum allowable bending curvature MCV1 of the third optical fiber F13 (i.e. GCV3<MCV3).

In the above-described example, each of the circular guides G11 to G13 is described as an independent member, and, however, it is merely an example. For example, one circular guide may wind and house a plurality of the optical fibers. In sum, two circular guides may be disposed, one circular guide may wind and house two optical fibers (e.g. the first optical fiber F11 and the second optical fiber F12) and the other circular guide may wind and house one optical fiber (e.g. the third optical fiber F13). Further, one circular guide may be disposed, the one circular guide may wind and house all optical fibers (e.g. the first optical fiber F11, the second optical fiber F12, and the third optical fiber F13).

In the above-described example, each of the circular guides G11 to G13 is described, and, however, the shape of the guide is not limited to the circular shape. As long as the bending curvature of the optical fiber circling the outer perimeter does not exceed the maximum allowable bending curvature of the optical fiber, the guide may be of any shape such as an ellipse, a rounded square, a rounded rectangle, and an arbitrary polygon (whose corner may be formed by a curved line or a straight line). Further, the optical fiber circling the guide may circle in contact with the outer perimeter of the guide or may circle along a route separated from the outer perimeter of the guide. Furthermore, although it is described above that the optical fiber circles the outer perimeter of the guide, this does not represent the optical fiber needs to make one revolution around the outer perimeter of the guide. A housing mode in which the optical fiber is bent along the outer perimeter of the guide in a route shorter than the one revolution such as ½ or ¼ of the outer perimeter is included. This is the same not only in the present exemplary embodiment, but also in the following exemplary embodiments.

The pluggable optical receptor 15 is configured in such a manner that the connectors of the external optical fibers 91 and 92 are insertable into and removable from the pluggable optical receptor 15.

Figure 6:
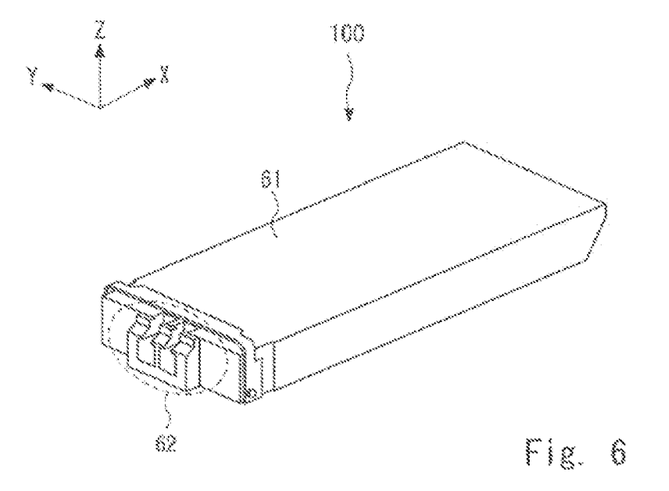
FIG. 6 is a perspective view of the pluggable optical module according to the first exemplary embodiment observed from a side of an optical fiber.
Figure 7:
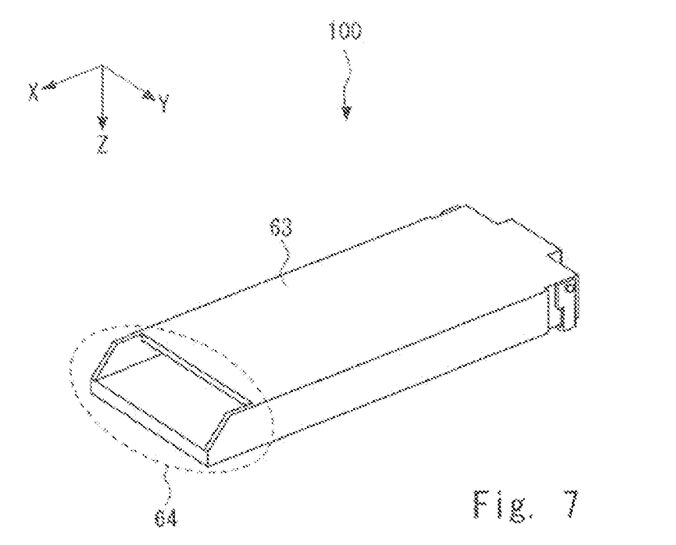
FIG. 7 is a perspective view of the pluggable optical module according to the first exemplary embodiment observed from a side of an optical communication apparatus.

An appearance of the pluggable optical module 100 will be described. FIG. 6 is a perspective view of the pluggable optical module 100 according to the first exemplary embodiment observed from a side of optical fibers 91 and 92. A numerical sign 61 shown in FIG. 6 indicates an upper surface of the pluggable optical module 100. A numerical sign 62 shown in FIG. 6 indicates an insertion port of the pluggable optical receptor 15 into which the connectors of the optical fibers 91 and 92 with connector enter. FIG. 7 is a perspective view of the pluggable optical module 100 according to the first exemplary embodiment observed from a side of the optical communication apparatus 93. A numerical sign 63 shown in FIG. 7 indicates a lower surface of the pluggable optical module 100. A numerical sign 64 shown in FIG. 7 indicates a connection part of the pluggable electric connector to which the optical communication apparatus 93 is connected.

As described above, according to the present configuration, it is possible to house the optical fiber used for optical wiring in the pluggable optical module 100 not to interfere with the other components.

In general, in a pluggable optical module used for the digital coherent optical communication, not only is it necessary to mount a plurality of components (the pluggable electric connector 11, the optical output module 12, the optical reception module 13, the optical fiber housing means 14, and the pluggable optical receptor 15 in the present exemplary embodiment) in the module, but also miniaturization of the size of the pluggable optical module is strongly required. Therefore, it is necessary to house a plurality of components in a relatively narrow housing and connect between the components using an optical fiber as necessary. However, it is difficult to prepare an optical fiber having an optimum length for each application due to variations in mounting positions of components and variations in cutting lengths of the optical fiber. Even when it can be achieved, the number of steps will increase. However, according to the present configuration, by preparing an optical fiber having a margin for a required length and winding the optical fiber around the optical guide as appropriate, the components in the pluggable optical module can be connected while compactly housing an extra part of the optical fiber. Therefore, without being affected by variations in mounting of parts and variations in cutting of fibers, it is possible to easily achieve an optical connection in the pluggable optical module using the optical fiber.

Further, in the present configuration, since the optical fiber used in the pluggable optical module has the margin length, it is possible to prevent an unnecessary tension from applying to the optical fiber when arranging the optical fiber between the different components via the guide. As a result, it is possible to prevent the optical fiber from being damaged in a manufacturing process of the pluggable optical module, and it can be understood that it is advantageous from the viewpoint of improving a manufacturing yield.

Furthermore, according to the present configuration, since a housing part of the optical fiber does not interfere with the other components and does not shift from the housed position, it is possible to prevent a situation that the housed optical fiber is damaged by contacting the other components. Thus, the optical fiber is not damaged even when the optical fiber receives a vibration and shock when the pluggable optical module is inserted into another apparatus. Therefore, it can be understood that the present configuration is advantageous from the viewpoint of preventing malfunction of the pluggable optical module 100 in operation.

Further, according to the present configuration, since the optical fiber can be housed in the plate-like optical fiber housing means in a circular pattern, a thickness in the optical fiber housing means can be suppressed. Therefore, the optical fiber housing means can be mounted in a narrow gap in the housing. Hence, it can be understood that it is advantageous from a view point of miniaturization of the pluggable optical module.

Second Exemplary Embodiment

A pluggable optical module 200 according to a second exemplary embodiment will be described. The pluggable optical module 200 according to the second exemplary embodiment has a configuration in which the optical fiber housing means 14 of the pluggable optical module 100 according to the first exemplary embodiment is replaced with optical fiber housing means 24. In the present exemplary embodiment, the optical fiber housing means 24 includes at least two guides to house and wind an optical fiber.

Figure 8:
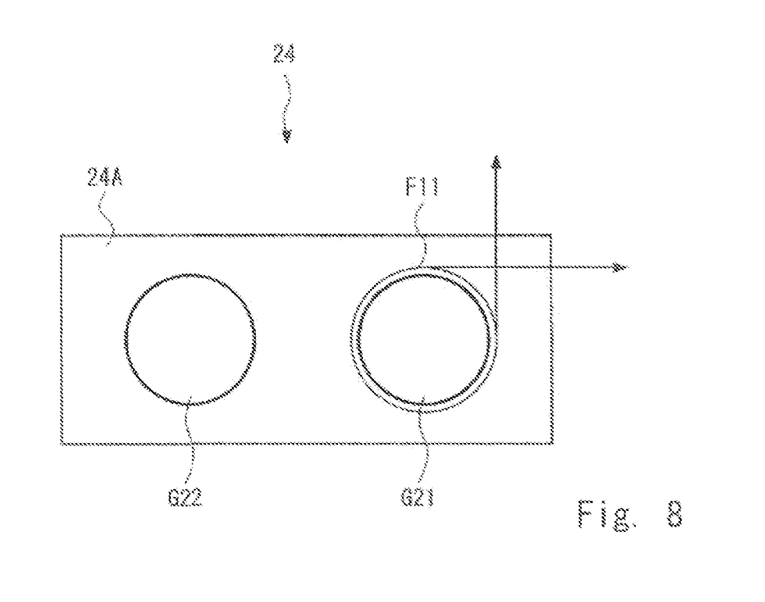
FIG. 8 is a top view schematically illustrating a housing example of an optical fiber in optical fiber housing means according to a second exemplary embodiment.

FIG. 8 is a top view schematically illustrating a housing example of the optical fiber in the optical fiber housing means 24 according to the second exemplary embodiment. The optical fiber housing means 24 has a configuration for housing and winding the first to third optical fibers F11 to F13 disposed in the pluggable optical module 100. The optical fiber housing means 24 can be configured, for example, using resin. The optical fiber housing means 24 can be easily manufactured, for example, by injection forming using a mold. In this example, the optical fiber housing means 24 includes circular guides G21 and G22 disposed on a plate 24A and configured to respectively wind the first to third optical fibers F11 to F13. In this example, in the same way as the circular guides G11 to G13 in FIG. 1, the circular guides G21 and G22 will be described as a thin cylindrical (or disk-like) member whose axis direction is a direction perpendicular to the plane of FIG. 8. In the optical fiber housing means 24 of FIG. 8, the first optical fiber F11 circles around one circular guide (the circular guide G11) and thereby the optical fiber is housed (Hereinafter, it is referred to as a first circular path.).

Figure 9:
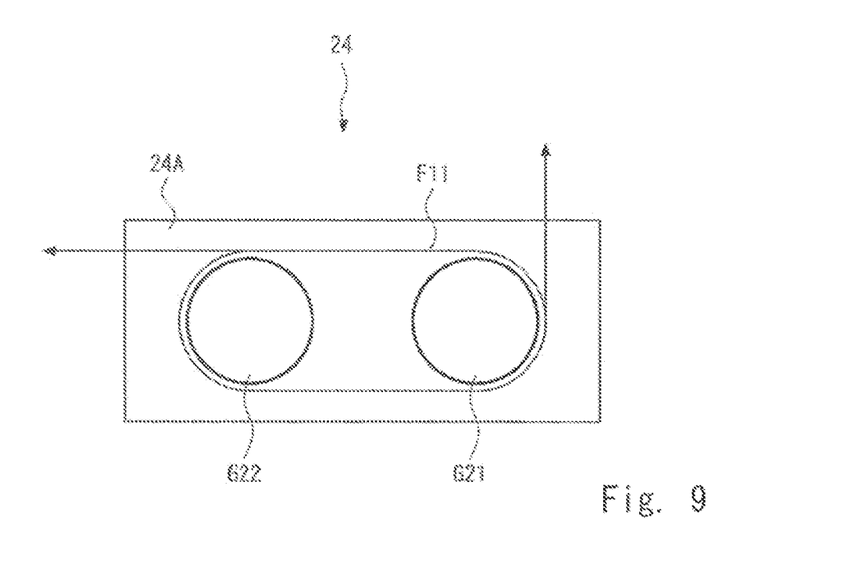
FIG. 9 is a top view schematically illustrating another housing example of the optical fiber in the optical fiber housing means according to the second exemplary embodiment.

FIG. 9 is a top view schematically illustrating another housing example of the optical fiber in the optical fiber housing means 24 according to the second exemplary embodiment. In this example, each optical fiber circles around a plurality of circular guides. Specifically, the first optical fiber F11 is housed by circling around outer perimeters of the circular guides G21 and G22 of the optical fiber housing means 24, for example. As illustrated in FIG. 9, the first optical fiber F11 can be housed by circling around the circular guides G21 and G22 once to surround the circular guides G21 and G22 (Hereinafter, it is referred to as a second circular path.).

Figure 10:
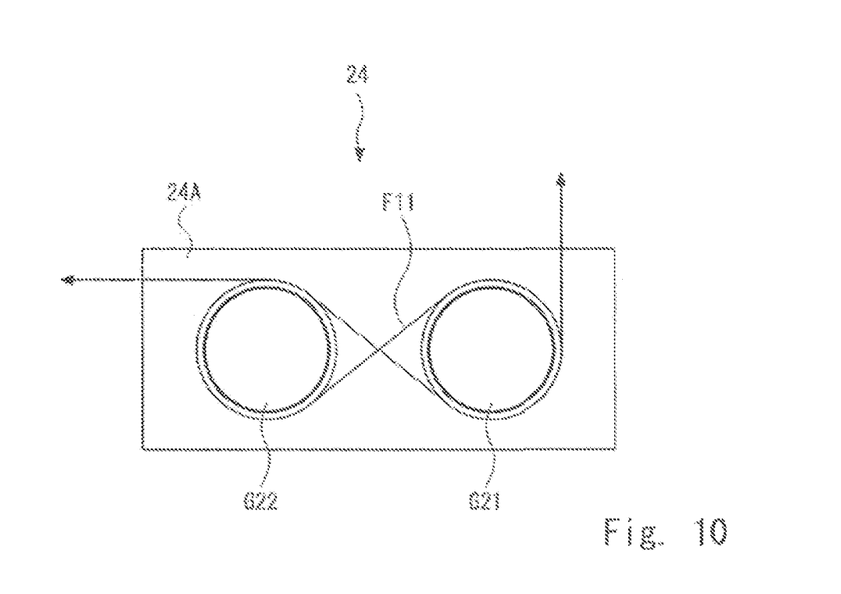
FIG. 10 is a top view schematically illustrating another housing example of the optical fiber in the optical fiber housing means according to the second exemplary embodiment.

FIG. 10 is a top view schematically illustrating another housing example of the optical fiber in the optical fiber housing means 24 according to the second exemplary embodiment. In this example, by causing the optical fiber to cross between the circular guides G21 and G22, and by causing the first optical fiber F11 to circle in such a manner that circling directions around the circular guides G21 and the circular guides G22 are different from each other, the first optical fiber F11 can be also housed (Hereinafter, it is referred to as a third circular path.).

Figure 11:
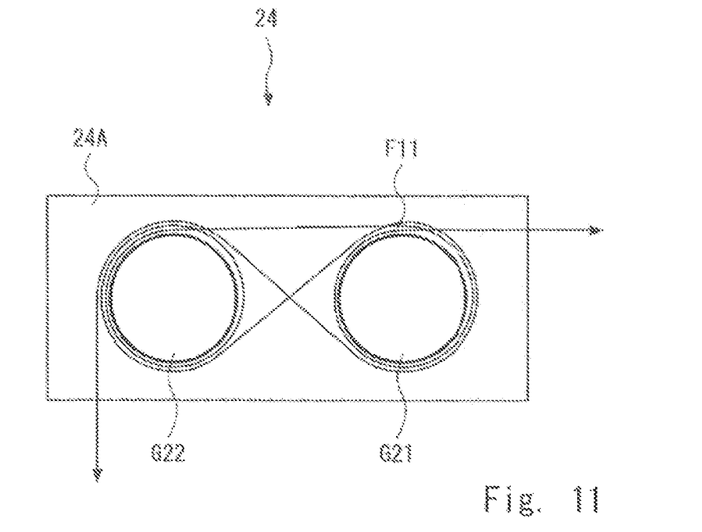
FIG. 11 is a diagram illustrating a housing example of the optical fiber when first to third circular paths are combined.

Further, the above-described first to third circular paths can be combined as appropriate. FIG. 11 is a diagram illustrating a housing example of the optical fiber when the first to third circular paths are combined. Note that, in the above examples, it should be appreciated that the first optical fiber F11 can be derived to any direction at any position on the circular path.

As described above in the present exemplary embodiment, one or more optical fibers can be wound by any of a plurality of types of paths between a plurality of guides or by a combination of a plurality of types of paths. Thus, the length of the optical fiber to be wound can be adjusted in multiple stages, and thereby it is possible to correspond to housing of various length optical fibers.

Note that, although the first optical fiber F11 has been illustrated in FIGS. 8 to 11, it should be appreciated that the second optical fiber F12 and the third optical fiber F13 can be housed in the same manner.

Third Exemplary Embodiment

A pluggable optical module 300 according to a third exemplary embodiment will be described. The pluggable optical module 300 has a configuration in which the optical fiber housing means 24 of the pluggable optical module 200 according to the second exemplary embodiment is replaced with optical fiber housing means 34. Hereinafter, the optical fiber housing means 34 will be described.

Figure 12:
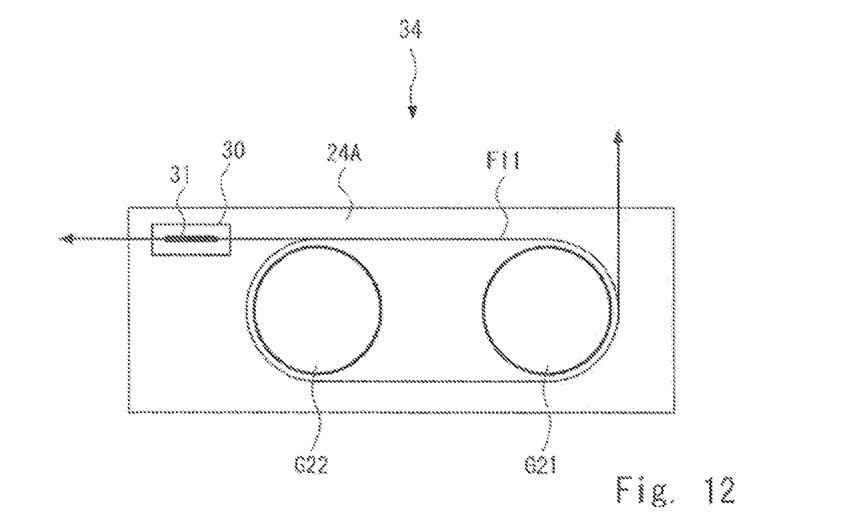
FIG. 12 is a top view schematically illustrating a configuration of optical fiber housing means according to a third exemplary embodiment.

FIG. 12 is a top view schematically illustrating a configuration of the optical fiber housing means 34 according to the third exemplary embodiment. The optical fiber housing means 34 has a configuration in which a splice housing 30 is added to the optical fiber housing means 24. In the present exemplary embodiment, a splice 31 that is a part in which two optical fibers are spliced (e.g. by fiber fusion) is disposed in the first optical fiber F11. The splice 31 is fixed by being housed in the splice housing 30 disposed on the plate 24A of the optical fiber housing means 34.

In general, the splice 31 is reinforced by covering a spliced part of two optical fibers with a reinforcing sleeve. For example, a groove into which the sleeve of the splice 31 is embedded is disposed in the splice housing 30. By embedding the splice 31 into this groove, the splice 31 can be fixed.

In general, in the optical fiber including the splice, a mechanical strength against pulling and bending of the spliced part of the fiber in the splice becomes smaller as compared with other parts. Thus, in the present configuration, by fixing the splice 31 with the splice housing 30, it is possible to suppress a movement of the splice 31 when a force is applied to the optical fiber and to reduce a burden on the spliced part of the optical fiber. As a result, even when the force is applied to the optical fiber when the optical fiber is arranged and the optical fiber housing means is attached, it is possible to prevent a breakage of the optical fiber from occurring.

Note that, although the first optical fiber F11 has been illustrated in FIG. 12, it should be appreciated that the second optical fiber F12 and the third optical fiber F13 can be housed in the same manner.

Fourth Exemplary Embodiment

A pluggable optical module 400 according to a fourth exemplary embodiment will be described. The pluggable optical module 400 has a configuration in which the optical fiber housing means 14 of the pluggable optical module 100 according to the first exemplary embodiment is replaced with optical fiber housing means 44. Hereinafter, the optical fiber housing means 44 will be described.

Figure 13:
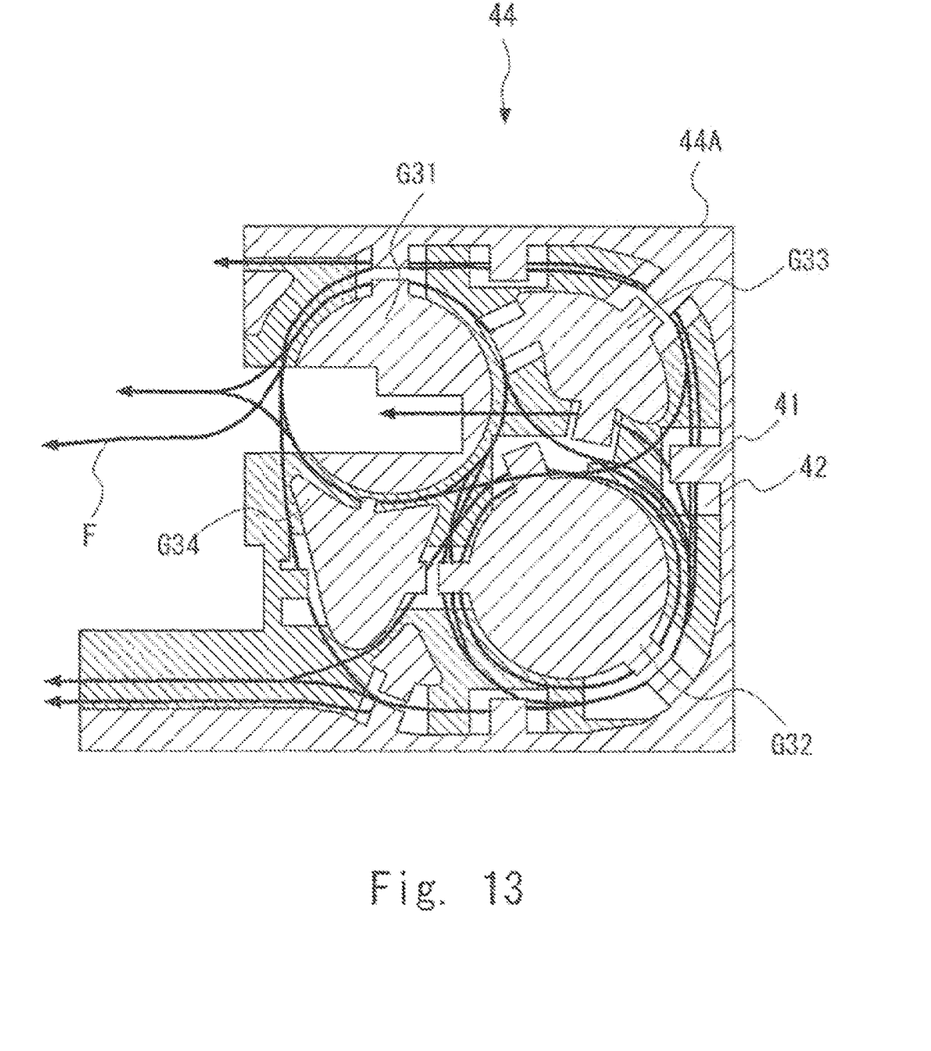
FIG. 13 is a top view schematically illustrating a configuration of optical fiber housing means according to a fourth exemplary embodiment.

FIG. 13 is a top view schematically illustrating a configuration of the optical fiber housing means 44 according to the fourth exemplary embodiment. The optical fiber housing means 44 includes circular guides G31 and G32, and guides G33 and G34 (also referred to as fourth to seventh guides). The circular guides G31 and G32 are disposed at diagonal positions of a square, respectively. The guides G33 and G34 are disposed at the diagonal positions of the square other than the positions at which the circular guides G31 and G32 are disposed, respectively.

Note that, for simplicity of the drawing, the optical fiber is denoted by a sign F in FIG. 13. In sum, the optical fiber F represents any of the first to third optical fibers F11 to F13. A coarse hatching part represents an upper surface of the guide and a surface having the same height as the upper surface of the guide. A dense hatching part represents a bottom surface of a groove through which the optical fiber passes. The bottom surface of the groove is lower than the upper surface of the guide.

The circular guides G31 and G32 can each wind the optical fiber using the first to third paths as in the second exemplary embodiment. The optical fiber can be bent along curved parts of the guides G33 and G34.

As illustrated in FIG. 13, the optical fiber can pass through a path that is from an outer perimeter of the circular guide G31 to an outer perimeter of the circular guide G32 via the curved part of the guide G33 (Needless to say that the optical fiber can pass through this path in an opposite direction.). The optical fiber can pass through a path that is from the outer perimeter of the circular guide G31 to the outer perimeter of the circular guide G32 via the curved part of the guide G34 (Needless to say that the optical fiber can pass through this path in an opposite direction.).

The optical fiber can be also arranged between the circular guide G31 and the guide G33 to the circular guides G31 and G32, and the guide G34 (Needless to say that the optical fiber can pass through this path in an opposite direction.). The optical fiber can be also arranged between the circular guide G32 and the guide G33 to the circular guides G31 and G32, and the guide G34 (Needless to say that the optical fiber can pass through this path in an opposite direction.). The optical fiber can be also arranged between the circular guide G31 and the guide G34 to the circular guides G31 and G32, and the guide G33 (Needless to say that the optical fiber can pass through this path in an opposite direction.). The optical fiber can be also arranged between the circular guide G32 and the guide G33 to the circular guides G31 and G32, and the guide G33 (Needless to say that the optical fiber can pass through this path in an opposite direction.).

The optical fiber housing means 44 includes projections 41 that project outward from outer perimeter surfaces of the circular guides G31 and G32, and the guides G33 and G34. The projects 41 projecting inward are also disposed inside an outer frame 40 that is formed to surround the circular guides G31 and G32, and the guides G33 and G34. The projection 41 is configured in such a manner that the optical fiber can pass through the lower side of the projection 41. Thus, it is possible to prevent the wound optical fiber from protruding above the optical fiber housing means 44 due to bending or twisting. Therefore, it is possible to more robustly house the optical fiber in the optical fiber housing means 44 and to prevent a situation in which the optical fiber is detached from the guide.

Further, in the pluggable optical module 400, an opening 42 is disposed under the projection 41. It is desirable that a width W1 of the opening 42 is wider a width W2 of the projection 41. In this case, since the optical fiber pressed by the projection 41 can be bent downward, housing of the optical fiber is facilitated. Further, even when a distance between a bottom surface of the optical fiber housing means 44 and a lower surface of the projection 41 is short, it is possible to ensure a space through which the optical fiber passes by disposing the opening 42.

The optical fiber may also be configured to be derived downward from the optical fiber housing means 44 through the opening 42, or to enter into the optical fiber housing means 44 from the lower side of the optical fiber housing means 44 through the opening 42 and to be wound around the circular guide. According to this, it is possible to more easily perform optical wiring with respect to components placed under the optical fiber housing means 44. Therefore, it is possible to increase a degree of freedom of arrangement of the optical fiber housing means 44 and other components.

Fifth Exemplary Embodiment

In the present exemplary embodiment, an aspect of mounting optical fiber housing means will be described.

Figure 14:
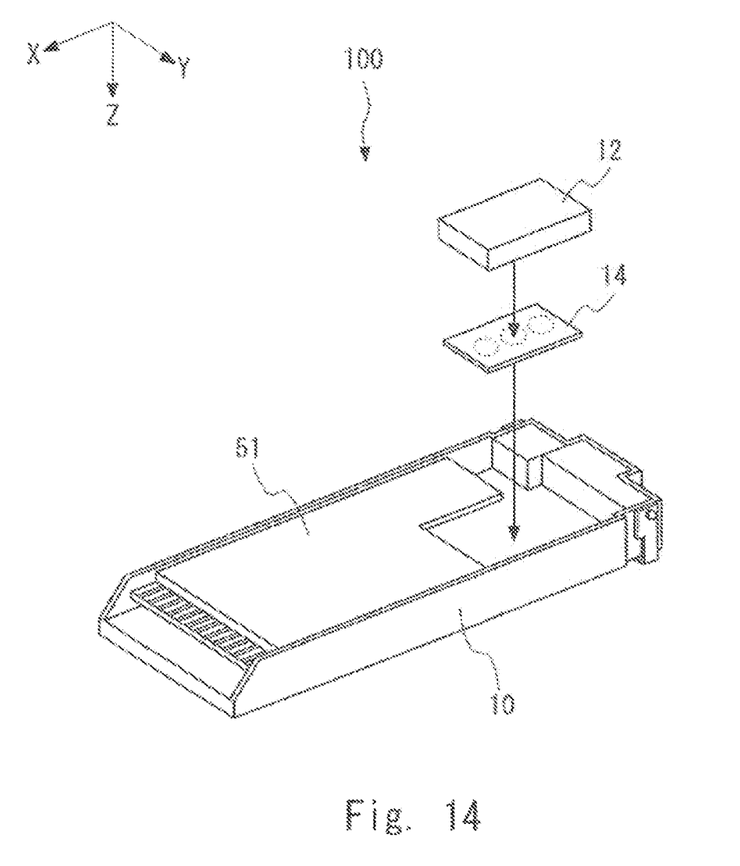
FIG. 14 is a perspective view schematically illustrating an internal configuration of a pluggable optical module according to a fifth exemplary embodiment.

Hereinafter, an aspect of mounting the optical fiber housing means 14 in the pluggable optical module 100 will be described. FIG. 14 is a perspective view schematically illustrating an internal configuration of the pluggable optical module 100 according to a fifth exemplary embodiment. As in FIG. 7, FIG. 14 is the perspective view of the pluggable optical module 100 observed from the optical communication apparatus 93. Note that FIG. 14 illustrates the example in which a lid of the lower surface constituting a housing 10 (the numerical sign 63 in FIG. 8) is removed.

As illustrated in FIG. 14, the plate-like optical fiber housing means 14 is mounted in an upper surface side (Z+ side) of the housing 10 in such a manner that a surface on which the optical fiber is housed faces upward (Z+ side). Further, a printed circuit board 51, on which optical modules (one or both of the optical output module 12 and the optical reception module 13), the pluggable electric connector 11, and the like are mounted, is mounted at a position where the printed circuit board 51 does not interfere with the optical fiber housing means 14, and a surface of the printed circuit board 51 on which components are mounted faces upward (Z+ direction). Furthermore, optical modules (one or both of the optical output module 12 and the optical reception module 13) are mounted below (Z− side) the optical fiber housing means 14.

The optical fiber housing means 14 is formed as a plate-like member, and the optical fibers that connect between optical components mounted in the pluggable optical module 100 are wound on this plate. Thus, the optical fiber housing means 14 can be arranged, in the housing, above and below the components and the printed circuit board on which the other components are mounted. In this case, the optical fiber housing means 14 is disposed in such a manner that the surface of the optical fiber housing means 14 on which the optical fiber is housed does not face the other components and the printed circuit board 51, and, in other words, the optical fiber housing means 14 is disposed in such a manner that the lower surface of the optical fiber housing means 14 faces the other components and the printed circuit board 51, so that it is possible to prevent the optical fiber from being damaged.

Further, for example, when there are two printed circuit boards stacked (or piled) in a vertical direction, the optical fiber housing means 14 may be disposed above or below the two printed circuit boards (a first and second printed circuit board) and may be interposed between the two printed circuit boards.

Other Exemplary Embodiments

The present invention is not limited to the above-described exemplary embodiments, and can be modified as appropriate without departing from the scope of the invention. For example, in the exemplary embodiments described above, the configuration in which the optical output module 12 and the optical reception module 13 are separately disposed and the local oscillation light LO is output from the optical output module 12 to the optical reception module 13, it is not limited to this configuration. For example, the optical output module 12 and the optical reception module 13 may be configured as a single optical module and the local oscillation light may be exchanged between an output part and a reception part of the optical module, for example, through the optical fiber.

In the exemplary embodiments described above, the example in which the first to third optical fibers F11 to F13 are disposed. However, further optical fiber may be disposed and housed in the optical fiber housing means as long as the further disposed optical fiber can be housed in the optical fiber housing means. Note that it is not necessary to house all the further optical fibers in the optical fiber housing means.

It is desirable that the optical fiber housing means is formed of a material having high thermal conductivity, for example. In this case, since it is possible to contribute to heat dissipation of other components mounted in the vicinity of the optical fiber housing means and the printed circuit board, it possible to improve heat radiation performance. Therefore, thermal runaway of a circuit can be suppressed.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2015-120419, filed on Jun. 15, 2015, the disclosure of which is incorporated herein in its entirety by reference.

REFERENCE SIGNS LIST

CON1 CONTROL SIGNAL
DAT DATA SIGNAL
F11 FIRST OPTICAL FIBER
F12 SECOND OPTICAL FIBER
F13 THIRD OPTICAL FIBER
G11 TO G13, G21, G22, G31, G32 CIRCULAR GUIDES
G33, G34 GUIDES
LO LOCAL OSCILATION LIGHT
LS1, LS2 OPTICAL SIGNALS
LORIG OUTPUT LIGHT
MOD MODULATION SIGNAL
PMA, PMB PHASE MODULATION AREAS
SIG_M1, SIG_M2 MODULATION SIGNALS
VBIAS BIAS VOLTAGE
10 HOUSING
11 PLUGGABLE ELECTRIC CONNECTOR
12 OPTICAL OUTPUT MODULE
13 OPTICAL RECEPTION MODULE
14, 24, 34, 44 OPTICAL FIBER HOUSING MEANS
14A, 24A, 44A PLATES
15 PLUGGABLE OPTICAL RECEPTOR
16 LIGHT SOURCE
17 OPTICAL MODULATION UNIT
17A OPTICAL MODULATOR
17B DRIVER CIRCUIT
30 SPLICE HOUSING
31 SPLICE
40 OUTER FRAME
41 PROJECTION
42 OPENING
51 PRINTED CIRCUIT BOARD
91, 92 OPTICAL FIBERS
93 OPTICAL COMMUNICATION APPARATUS
100, 200, 300, 400 PLUGGABLE OPTICAL MODULES
171 TO 174 OPTICAL WAVEGUIDES
1000 OPTICAL COMMUNICATION SYSTEM

What is claimed is:
1. A pluggable optical module comprising:
a pluggable electric connector configured to connect with an optical communication apparatus;

a pluggable optical receptor configured to connect with an outer optical fiber, the outer optical fiber being configured to transmit a first optical signal;

an optical output module configured to output a second optical signal and a local oscillation light;

an optical reception module configured to coherently receive the first optical signal by interfering with the local oscillation light;

a first optical fiber configured to transmit the second optical signal from the optical output module to the pluggable optical receptor;

a second optical fiber configured to transmit the local oscillation light from the optical output module to the optical reception module;

a third optical fiber configured to transmit the first optical signal from the pluggable optical receptor to the optical reception module; and an optical fiber housing comprising a plurality of guides configured to form at least a part of circular paths of the first optical fiber, the second optical fiber and the third optical fiber, wherein at least one of the circular paths of the first optical fiber, the second optical fiber and the third optical fiber is different from other circular paths.

2. The pluggable optical module according to claim 1, wherein the pluggable electric connector is configured to be insertable into and removable from the optical communication apparatus.

3. The pluggable optical module according to claim 1, wherein the pluggable electric connector is capable of communicating a modulation signal, a communication data signal, and a control signal with the optical communication apparatus.

4. The pluggable optical module according to claim 3, wherein the second optical signal is modulated in response to the modulation signal.

5. The pluggable optical module according to claim 3, wherein the optical reception module is configured to output the communication data signal generated by demodulating the first optical signal.

6. The pluggable optical module according to claim 1, wherein the pluggable optical receptor is configured in such a manner that optical fibers are insertable into and removable from the pluggable optical receptor.

7. The pluggable optical module according to claim 1, wherein:
the first optical fiber is connected between the optical output module and the pluggable optical receptor;
the second optical fiber is connected between the optical output module and the optical reception module; and
the third optical fiber is connected between the optical reception module and the pluggable optical receptor.

8. The pluggable optical module according to claim 1, wherein the optical fiber housing comprises a guide around which the first to third optical fibers can circle, extra lengths of the first to third optical fibers being wound and housed by the guide.

9. The pluggable optical module according to claim 1, wherein the optical reception module is a coherent optical reception module.

10. The pluggable optical module according to claim 1, wherein:
the optical fiber housing comprises:
a plate; and
at least two guides formed on the plate, and
each of the first to third optical fibers is wound and housed in any of a first path circling one of the two guides, a second path circling to surround the two guides, and a third path circling each of the two guides, in a combination of two of the first to third paths, or in a combination of three of the first to third paths.

11. The pluggable optical module according to claim 10, wherein:
a part or all of the first to third optical fibers include a splice, and
the optical fiber housing further comprises a splice housing that is formed on the plate and configured to house and fix the splice.

12. The pluggable optical module according to claim 10, wherein the optical fiber housing comprises first to third guides formed on the plate and configured to respectively wind and house the first to third optical fibers.

13. The pluggable optical module according to claim 10, wherein: the optical fiber housing comprises fourth to seventh guides, and each of the first to third optical fibers is wound and housed by using a path that is a combination of a part or all of the fourth to seventh guides.

14. The pluggable optical module according to claim 10, wherein:
the at least two guides include a projection that projects outward from an outer perimeter of the guides, and
the first to third optical fibers pass under the projection of the guides.

15. The pluggable optical module according to claim 14, wherein the optical fiber housing further comprises an opening that is disposed under the projection of the guides, penetrates the plate, and has a width larger than the projection of the guides.

16. The pluggable optical module according to claim 10, wherein:
the optical fiber housing further comprises an outer frame that is disposed on the plate and formed to surround the guides,
the outer frame includes a projection that projects to the guides, and
the first to third optical fibers pass under the projection of the outer frame.

17. The pluggable optical module according to claim 16, wherein the optical fiber housing further comprises an opening that is disposed under the projection of the outer frame, penetrates the plate, and has a width larger than the projection of the outer frame.

18. The pluggable optical module according to claim 1, wherein the optical fiber housing is mounted to be stacked with all or a part of the optical output module, the optical reception module, and a printed circuit board on which components are mounted.

19. The pluggable optical module according to claim 18, wherein one or both of the optical output module and the optical reception module are mounted on the printed circuit board.

20. The pluggable optical module according to claim 18, wherein the optical fiber housing is mounted to interpose between a first printed circuit board and a second printed circuit board.

21. The pluggable optical module according to claim 18, wherein the optical fiber housing is mounted in such a manner that a surface of the optical fiber housing on which the first to third optical fibers are housed faces a side opposite to the part or all of the optical output module, the optical reception module, and the printed circuit board that are stacked.

\* \* \* \* \*